Figure 1:
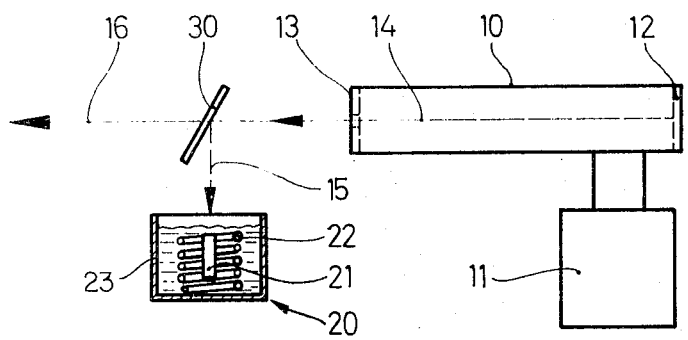

United States Patent

Erben et al.

[11] 3,845,411
[45] Oct. 29, 1974

[54] OPTICAL HOLMIUMETHYLSULPHATE MODULATOR

[75] Inventors: Klaus-Dieter Erben; Walter Kroy; Walter E. Mehnert, all of Munich, Germany

[73] Assignee: Messerschmitt-Bolkow-Blohm GmbH, Munich, Germany

[22] Filed: Aug. 21, 1972

[21] Appl. No.: 282,473

Related U.S. Application Data

[63] Continuation of Ser. No. 886,626, Dec. 19, 1969, abandoned.

[52] U.S. Cl. ............................ 332/7.51, 30/160 R
[51] Int. Cl. .............................................. H01s 3/10
[58] Field of Search ............ 350/160, 161; 332/751; 250/199

[56] References Cited
UNITED STATES PATENTS

| | | | |
|---|---|---|---|
| 3,414,728 | 12/1968 | Patel | 250/199 |
| 3,446,966 | 5/1969 | Peterson | 332/7.51 |
| 3,457,417 | 7/1969 | Buchsbaum et al. | 250/199 |
| 3,516,728 | 6/1970 | Fenner | 350/160 |
| 3,517,982 | 8/1968 | Banardi | 332/7.51 |

OTHER PUBLICATIONS

Grahmann et al., "Spectrum, Feemon Effect..." 1961, pg. 243–256, Zeitschrift fur Physik, 164.
Geusic et al., "Electrooptic Properties of..." 4/15/64, pg. 141–143, A.P.L., Vol. 4, No. 8.
Cooke et al., "The Magnetic Susceptibilities of..." 11/2/64, pg. 767–781, Proc. Phys. Soc., Vol. 85.

*Primary Examiner*—Richard A. Farley
*Assistant Examiner*—N. Moskowitz
*Attorney, Agent, or Firm*—Woodhams, Blanchard and Flynn

[57] ABSTRACT

Method and apparatus for modulating the intensity of an infra-red laser. Same consists of placing a holmiumethylsulphate crystal in the path of said beam and effecting beam modulating control thereof by controlling an electric or magnetic field surrounding same. Alternate means consist of splitting the beam and effecting feedback to the beam generating apparatus.

12 Claims, 2 Drawing Figures

OPTICAL HOLMIUMETHYLSULPHATE MODULATOR

This is a continuation, division, of appliation Ser. No. 886,626, filed Dec. 19, 1969, now abandoned.

The invention relates to a method of modulating a gas laser, for example for modulating the intensity of an infra-red laser, and also to an apparatus for carrying out this method.

Hitherto it has only been possible to modulate the intensity of a gas laser, by controlling the output power of the main network supply arrangement, within certain limits. It has also been possible to alter the intensity of the gas laser beam, after it has left the laser, by light-absorbing devices. For example electro-optical devices such as Kerr cells and Faraday devices have been used for this purpose. Another, known method made provision for modulating the output intensity of a laser beam by moving a resonator mirror. All these known arrangements and methods entail the drawback of a relatively low limit frequency. It has hitherto been impossible to effect intensity modulation in the infrared spectral region in particular.

It is the object of the invention to provide a method, and also an apparatus for carrying out this method, whereby it is in particular possible to transmit information through the atmosphere and over wide areas, this information transmission taking place by means of a laser and in the infra-red spectral region.

The method proposed according to the invention enables this object to be realized by modulating the beam of an infra-red laser, operating at a specified frequency, by altering the optical characteristics of a crystal which is in turn accomplished by altering a magnetic or electrical field, this operation being carried out at specific temperatures and at specific pressures (liquid nitrogen or liquid helium at 1°K to 100°K) in a modulator, both the absorption edges of the crystal and also the amplitude interferences in the resonator system being utilized.

This method enables substantially higher modulation frequencies to be used than has hitherto been possible. Further, it is possible for the first time, in spite of such higher frequencies, to use an infra-red laser for the transmission of information through the atmosphere and over wide areas.

According to a modification of the method proposed according to the invention, the beam of the infra-red laser is modulated by altering the optical characteristics of liquids or gases in a magnetic or electrical field, this being carried out subject to specific temperatures and pressures. Among other things, this method permits ready exchangeability of the modulating system, as under these circumstances substances which have been used up can be readily replaced or exchanged during operations.

For carrying out the method proposed according to the invention it is suggested that a crystal, which is for example of holmiumethylsul phate and which is disposed in a temperature-pressure bath and in a magnetic coil, should be used in conjunction with an infra-red laser, preferably an infra-red laser whose wavelength lies in one of the absorption minima of for example 8–11 $\mu$ of the earht's atmosphere.

It is further proposed to arrange a beam dividing device in the path of the laser beam, with a view to splitting up the laser beam into an auxiliary modulation beam, which passes into the modulatior, and into a carrier beam. These expedients result in reduced demands being imposed on the cooling system of the modulator.

However, if higher modulation frequencies are to be attained, then the invention makes provision for placing the modulator directly in the path of the laser beam.

According to a further modification of the invention, the modulator is composed of a crystal positioned between two condenser plates and of a temperature-pressure bath. It is also proposed according to one embodiment of the invention that the modulator should be directly positioned in the path of the beam.

According to a further embodiment of the invention there is proposed an arrangement for modulating a laser beam, in which, without high additional expenses, high modulation frequencies (about 100 Giga-Hertz) can be attained.

Figure 2:
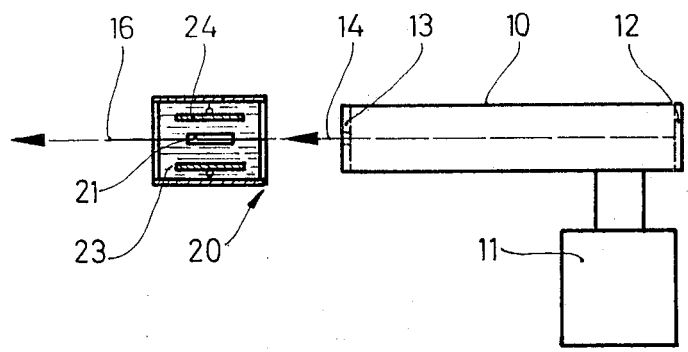

The invention is described below by way of examples thereof and is illustrated, that further advantages and expedients will be apparent. In these drawings:

FIG. 1 shows, diagrammatically, the layout of the arrangement proposed according to the invention, and FIG. 2 represents a further embodiment of an arrangement, according to the invention, represented diagrammatically;

A laser (FIG. 1), preferably an infra-red gas laser 10, operating according to the continuous wave method, emits a monochromatic, coherent light beam 14. A main supply system 11 provides the laser 10 with pump energy. According to one embodiment of the invention, the laser beam 14, which leaves the laser 10 through a mirror window 13, comes into contact with a beam dividing device 30, as a result of which a part of the beam 14 is deflected into the modulator 20 as a so-called auxiliary, modulating beam 15. Modulator 20 consists of a suitable crystal 21 formed of a substance - for example of holmiumethylsulphate - which is subject to a specific temperature (for example 4°K) by a cooling liquid 23, and to a specific pressure (for example 1 atmosphere). The crystal 21 is arranged in a magnetic or electrical field of suitable strength, for example 5 kG or $10^4$ V/cm, which is produced by a coil 22 or by condenser plates 24. The optical characteristics, particularly the position of the absorption edges, of the crystal 21 are variable by altering the field strengths. The alteration of the field strength is accomplished by varying the voltage and the current in the field exciting devices (coil 22 and condenser 24). By this expedient it is possible to shift the frequency position of the absorption edge through the natural or intrinsic frequency of the laser. In this way the optical characteristics of the crystal 21 are altered with regard to the permeability of the crystal, to the selected laser frequency and with respect to the powers of absorption exercised by the crystal. By reason of the large coherence length of the laser light (in the order of magnitude of kilometers), the modulator 20 is to be regarded as part of the laser resonator system 10. In consequence of the alteration of the auxiliary, modulation beam 15, following the alteration of the absorption characteristics of the crystal 21, the effectiveness of the laser resonator 10 is influenced, as a result of which the output intensity is again modified. The effect of the modulator 20 on the laser resonator 10 is extended with the phase speed of the light in the resonator, as a result of which high modulation frequencies are attained.

According to a further embodiment of the invention (FIG. 2) the whole of the laser beam strength, that is to say the main beam 14, is either absorbed or allowed to pass by a suitable crystal 21 of a substance, the optical characteristics of the substance being so altered - by the application of electrical and/or magnetic fields - that the frequency position of the absorption edges of the crystal 21 is shifted through the laser intrinsic frequency. The following are modulation methods, which are known in classical electronic theory and practice, for both embodiments, as illustrated in FIG. 1 and FIG. 2: amplitude modulation, phase modulation, pulse amplitude modulation, pulse phase modulation, or pulse code modulation.

It is also possible to use - for transmissions through the atmosphere in which amplitude disturbances are prevented from occurring - a so-called auxiliary carrier method, in which an auxiliary carrier, is first frequency-modulated with the signal and the light beam is amplitude-modulated with this auxiliary carrier. At the receiver end, the signal then first of all appears as a modulated auxiliary carrier, which is then demodulated in the normal way.

We claim:

1. An infrared radiation modulation apparatus, comprising:
   a single crystal consisting of holmiumethylsulphate, said crystal being adapted for irradiation with infrared radiation;
   means for irradiating said crystal with coherent infrared radiation; and
   means coupled to said crystal for modulating said infrared radiation.

2. Apparatus according to claim 1, wherein said means coupled to said crystal comprises means for generating a variable magnetic field for effecting an alteration of the optical characteristics of said crystal by varying the absorption power of said crystal.

3. Apparatus according to claim 2, wherein said variable magnetic field generating means comprises a coil; and
   wherein said crystal is located along the central axis of said coil.

4. Apparatus according to claim 3, wherein said means for irradiating said crystal includes an infrared radiation dividing means for directing a portion of said infrared radiation along said central axis of said coil and on said crystal.

5. Apparatus according to claim 1, wherein said means coupled to said crystal comprises means for generating a variable electric field for effecting an alteration of the optical characteristics of said crystal by varying the absorption power of said crystal.

6. Apparatus according to claim 5, wherein said variable electric field generating means comprises a pair of spaced condensor plates; and
   wherein said crystal is located along the central axis between said plates.

7. Apparatus according to claim 6, wherein said crystal is located in the direct path of said infrared radiation.

8. Apparatus according to claim 1, wherein said infrared radiation has a wavelength in the range of 8 microns to 11 microns.

9. Apparatus according to claim 8, wherein said crystal is subjected to a temperature of 4°K. and a pressure of 1 atmosphere.

10. In a method of modulating the intensity of a gas infrared laser, the steps comprising:
    generating a variable magnetic or electric field;
    subjecting a single crystal consisting of holmiumethylsulphate to said magnetic or electric field;
    irradiating said crystal with coherent infrared radiation; and
    further subjecting said crystal to a temperature of 4°K. and a pressure of 1 atmosphere whereby to alter the optical characteristics of said crystal by varying the absorption power of said crystal.

11. An infrared radiation modulation apparatus, comprising:
    a single crystal consisting of holmiumethylsulphate, said crystal being adapted for irradiation with infrared radiation having a wavelength in the range of 8 microns to 11 microns and having an optical characteristic wherein said infrared radiation is absorbed in relation to the magnitude of a magnetic field;
    means defining a coil for generating a variable magnetic field for effecting an alteration of said optical characteristics of said crystal by varying the absorption power of said crystal, the central axis of said coil being transverse to said coherent infrared radiation beam, said crystal being located along the central axis of said coil;
    gas laser means for generating a coherent infrared radiation beam having a wavelength in the range of 8 microns to 11 microns;
    infrared radiation dividing means for directing a portion of said infrared radiation along said central axis of said coil and on said crystal for irradiating said crystal with said infrared radiation; and
    means for subjecting said crystal to a cooling temperature.

12. An infrared radiation modulation apparatus, comprising:
    a single crystal consisting of holmiumethylsulphate, said crystal being adapted for irradiation with infrared radiation having a wavelength in the range of 8 mcirons to 11 microns and having an optical characteristic wherein said infrared radiation is absorbed in relation to the magnitude of an electric field;
    means defining a pair of spaced and parallel condensor plates for generating a variable electric field for effecting an alteration of said optical characteristics of said crystal by varying the absorption power of said crystal, said crystal being located along the central axis between said plates equidistant from both of said plates;
    gas laser means for generating a coherent infrared radiation beam having a wavelength in the range of 8 microns to 11 microns, said crystal being located in the direct path of said infrared radiation beam; and means for subjecting said crystal to a cooling temperature.

* * * * *